(12) United States Patent
Kim et al.

(10) Patent No.: US 10,687,199 B2
(45) Date of Patent: Jun. 16, 2020

(54) METHOD AND APPARATUS FOR PERFORMING COMMUNICATION IN WIRELESS COMMUNICATION SYSTEM

(71) Applicant: Samsung Electronics Co., Ltd., Suwon-si, Gyeonggi-do (KR)

(72) Inventors: Jang-gon Kim, Suwon-si (KR); Jae-jun Lee, Suwon-si (KR); Young-kyo Baek, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/050,394

(22) Filed: Jul. 31, 2018

(65) Prior Publication Data

US 2018/0367977 A1 Dec. 20, 2018

Related U.S. Application Data

(63) Continuation of application No. 15/196,926, filed on Jun. 29, 2016, now Pat. No. 10,057,754.

(30) Foreign Application Priority Data

Jun. 29, 2015 (KR) .................. 10-2015-0092406

(51) Int. Cl.
| | |
|---|---|
| *H04W 4/00* | (2018.01) |
| *H04W 8/00* | (2009.01) |
| *H04W 4/80* | (2018.01) |
| *H04W 36/00* | (2009.01) |

(52) U.S. Cl.
CPC ............ *H04W 8/005* (2013.01); *H04W 4/80* (2018.02); *H04W 36/03* (2018.08)

(58) Field of Classification Search
None
See application file for complete search history.

(56) References Cited

U.S. PATENT DOCUMENTS

| | | |
|---|---|---|
| 2015/0029866 A1 | 1/2015 | Liao et al. |
| 2015/0036578 A1 | 2/2015 | Wu et al. |
| 2015/0036579 A1 | 2/2015 | Wu et al. |

(Continued)

FOREIGN PATENT DOCUMENTS

| | | | |
|---|---|---|---|
| CN | 106211087 | * 12/2016 | .............. H04W 4/06 |
| WO | 2015/047167 A1 | 4/2015 | |

OTHER PUBLICATIONS

Huawei et al.; eMBMS traffic relay enhancement; SA WG2 Meeting #108; S2-150829; Apr. 13-17, 2015; San Jose Del Cabo, Mexico.

(Continued)

*Primary Examiner* — Suhail Khan
(74) *Attorney, Agent, or Firm* — Jefferson IP Law, LLP

(57) ABSTRACT

A method of a terminal for performing communication is provided. The method includes, transmitting, by a terminal located outside a cell coverage area, a request message requesting monitoring of a temporary mobile group identity (TMGI) to a relay terminal located within the cell coverage area, receiving a monitoring response message including a layer-2 group identification (ID) in a proximity-based service from the relay terminal, receiving a TMGI announcement message including the layer-2 group ID from the relay terminal, when the relay terminal detects the TMGI, and receiving data related to the TMGI by using the layer-2 group ID.

13 Claims, 11 Drawing Sheets

(56) References Cited

U.S. PATENT DOCUMENTS

2015/0172896 A1  6/2015  Van Phan et al.
2016/0323777 A1  11/2016 Pan et al.
2018/0295671 A1* 10/2018 Kim ..................... H04W 4/06

OTHER PUBLICATIONS

3GPP; 3rd Generation Partnership Project; Technical Specification Group Services and System Aspects; Study on extending architecture support for proximity-based services (Release 13); 3GPP TR 23.713; V1.4.0; Jun. 2015; Valbonne, France.
LG Electronics, "Clarification on TMGI Advertisement Procedure and Resolving the Related FFS," SA WG2 Meeting #109, May 25-29, 2015, pp. 1-5, S2-151612, Fukuoka, Japan.
Qualcomm Incorporated et al, "TMGI and ECGI Advertisment," SA WG2 Meeting #109, pp. 1-8, S2-151794, Fukuoka, Japan.
European Office Action dated Mar. 4, 2019, issued in a counterpart European application No. 16618196.0-1214.
LG Electronics; Clarification on TMGI advertisement procedure and resolving the related FFS; SA WG2 Temporary Document; S2-151612; SA WG2 Meeting #109; May 25-29, 2015, Fukuoka Japan.
3GPP TS; 3rd Generation Partnership Project; Technical Specification Group Radio Access Network; Evolved Universal Terrestrial Radio Access (E-UTRA);Medium Access Control (MAC) protocol specification (Release 12); 3GPP TS 36312; V12.5.0; Mar. 2015; Valbonne, France.
ZTE: "Reuse the ProSe Later-2 Group ID for Embms traffic relay", Jan. 25, 2015, XP050942036.
European Office Action dated Feb. 6, 2020 issued in European Application No. 16818198.0.

* cited by examiner

METHOD AND APPARATUS FOR PERFORMING COMMUNICATION IN WIRELESS COMMUNICATION SYSTEM

CROSS-REFERENCE TO RELATED PATENT APPLICATION(S)

This application is a continuation application of prior application Ser. No. 15/196,926, filed on Jun. 29, 2016, which claimed the benefit under 35 U.S.C. § 119(a) of a Korean patent application filed on Jun. 29, 2015 in the Korean Intellectual Property Office and assigned Serial number 10-2015-0092406, the entire disclosure of which is hereby incorporated by reference.

TECHNICAL FIELD

The present disclosure relates to a method and apparatus for performing communication in a wireless communication system, and a non-transitory recording medium having recorded thereon a computer program for executing the method of performing communication in a wireless communication system.

BACKGROUND

A proximity service (ProSe) denotes a method of supporting communication between physically-close devices. In detail, ProSe aims to discover an application operating in adjacent devices and eventually to support an operation of exchanging application-related data. For example, it may be considered to apply ProSe to a social network service (SNS), business, and applications, such as games.

ProSe may also be called device-to-device (D2D) communication. In other words, ProSe means a communication method of setting a direct link between a plurality of devices (for example, user equipment (UE)) and directly transmitting and receiving user data (e.g., voices and multimedia data) between the devices, rather than via a network. ProSe communication may include UE-to-UE communication, peer-to-peer communication, and the like. ProSe may be applied to machine-to-machine (M2M) communication, machine type communication (MTC), etc. Accordingly, ProSe is considered a way to resolve a burden on a base station due to rapidly-increasing data traffic. Moreover, introduction of ProSe may produce effects, such as a procedural simplification of a base station, a power consumption decrease of devices that participate in ProSe, a data transmission speed increase, a capacity increase of a network, load balancing, and cell coverage expansion.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for data to be easily provided to a terminal even when the terminal deviates from a coverage area, by supporting proximity service (ProSe) communication and an evolved multimedia broadcast multicast service (eMBMS) with respect to the terminal.

Additional aspects will be set forth in part in the description which follows and, in part, will be apparent from the description, or may be learned by practice of the presented embodiments.

In accordance with an aspect of the present disclosure, a method of a terminal for performing communication is provided. The method includes transmitting, by the terminal located outside a cell coverage area, a request message requesting monitoring of a temporary mobile group identity (TMGI) to a relay terminal located within the cell coverage area, receiving a monitoring response message including a layer-2 group identification (ID) in a proximity-based service from the relay terminal, receiving a TMGI announcement message including the layer-2 group ID from the relay terminal, when the relay terminal detects the TMGI, and receiving data related to the TMGI by using the layer-2 group ID.

In accordance with an aspect of the present disclosure, a method of a relay terminal for performing communication is provided. The method includes receiving, by the relay terminal located within a cell coverage area, a request message requesting monitoring of a temporary mobile group identity (TMGI) from a terminal located outside the cell coverage area, transmitting a monitoring response message including a layer-2 group ID in a proximity-based service, when a service area ID included in the received request message corresponds to at least one service area ID included in a preset list; and transmitting a TMGI announcement message including the layer-2 group ID to the terminal, when the TMGI is detected based on the layer-2 group ID.

In accordance with an aspect of the present disclosure, a terminal for performing communication is provided. The terminal includes a processor configured to select a relay terminal located within a cell coverage area, when the terminal is located outside the cell coverage area, and a radio frequency (RF) transceiver configured to transmit a request message requesting monitoring of temporary mobile group identity (TMGI) to the relay terminal, receive a monitoring response message including layer-2 group ID in a proximity-based service from the relay terminal, receive a TMGI announcement message including the layer-2 group ID as the relay terminal detects the TMGI, and receive data related with the TMGI by using the layer-2 group ID.

In accordance with an aspect of the present disclosure, a relay terminal for performing communication is provided. The relay terminal includes a radio frequency (RF) transceiver configured to receive a request message requesting monitoring of a temporary mobile group identity (TMGI) from a terminal located outside a cell coverage area, and transmit a monitoring response message including a layer-2 group ID in a proximity-based service, when a service area ID included in the received request message corresponds to at least one service area ID included in a preset list; and a processor configured to detect the TMGI based on the layer-2 group ID, wherein the RF transceiver is further configured to transmit a TMGI announcement message including the layer-2 group ID to the terminal, when the TMGI is detected.

In accordance with an aspect of the present disclosure, a non-transitory computer-readable recording medium has recorded thereon a computer program, which, when executed by a computer, performs the method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
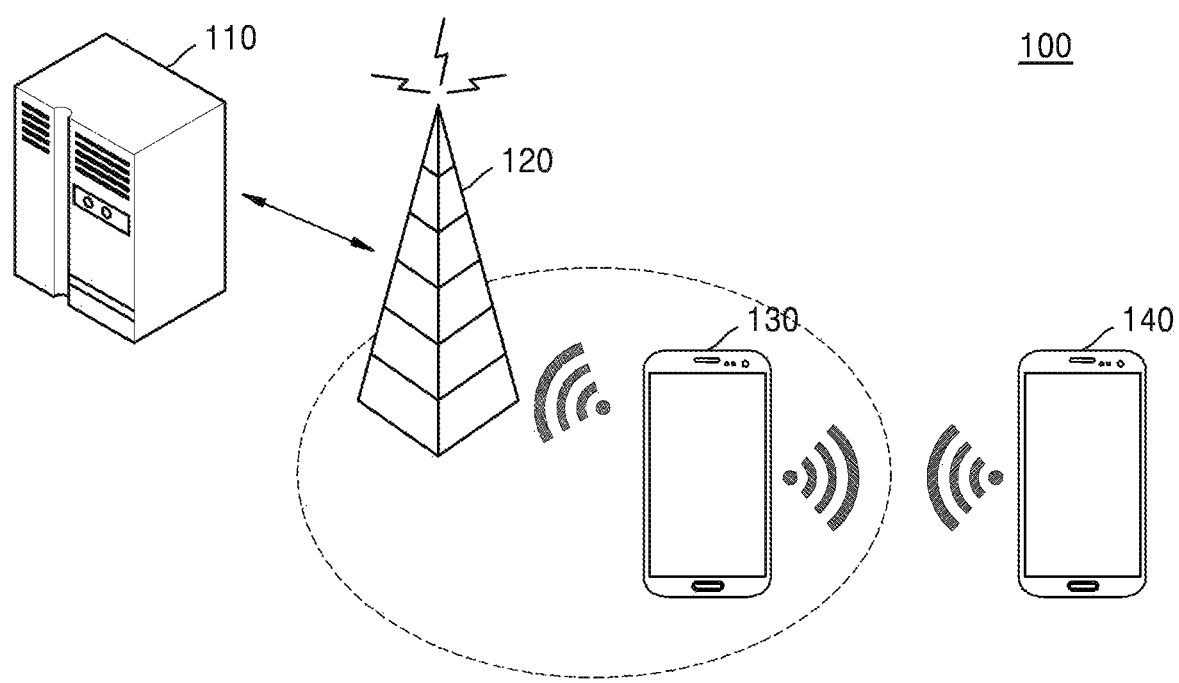
FIG. 1 is a schematic view for explaining a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

In the following embodiments, components and features of the present disclosure may be combined into predetermined forms. Each component or feature may be implemented without being combined with another component or feature. The order of operations described in various embodiments of the present disclosure may be changed. Some components or features in one embodiment may be included in another embodiment, or may be replaced by corresponding components or features in another embodiment.

It is to be understood that the singular forms "a," "an," and "the" include plural referents unless the context clearly dictates otherwise. Thus, for example, reference to "a component surface" includes reference to one or more of such surfaces.

In some cases, to avoid ambiguity in the concept of the present disclosure, well-known structures and devices may be omitted, or may each be illustrated in the form of a block diagram focused on the core function of each of the structures and devices. Like numbers refer to like elements throughout.

Various embodiments of the present disclosure may be supported by standard documents disclosed in relation to at least one of an Institute of Electrical and Electronics Engineers (IEEE) 802-series system, a 3rd generation partnership project (3GPP) system, 3GPP long term evolution (LTE) and LTE-advanced (LET-A) systems, and a 3GPP2 system. In other words, operations or portions not described in various embodiments of the present disclosure in order to clearly reveal the technical spirit of the present disclosure may be supported by the standard documents. All terms disclosed herein may be explained by the standard documents.

Technology below may be used in various wireless communication systems. For clarity, 3GPP LTE and 3GPP LTE-A systems will now be focused and described, but the technical spirit of the present disclosure is not limited thereto.

Terms used herein are defined as follows:

The user equipment (UE) may be mentioned as a terminal, mobile equipment (ME), a mobile station (MS), or the like. The UE may be a portable device, such as a notebook, a mobile phone, a personal digital assistant (PDA), a smailphone, or a multimedia device, or may be a non-portable device, such as a personal computer (PC) or a vehicle-mounted device. The UE is capable of performing communication in a 3GPP spectrum (e.g., LTE) and/or a non-3GPP spectrum (e.g., wireless-fidelity (Wi-Fi) or a public safety spectrum).

Proximity Services or proximity-based services (ProSe) are services enabling a discovery among physically-adjacent devices and mutual direct communication/communication via a base station/communication via a third device. User plane data is exchanged via a direct data path, rather than via a 3GPP core network (for example, electronic power control (EPC)).

Proximity: UE that is proximate to another UE is determined according to whether a predetermined proximity criterion is satisfied. Different proximity criteria may be set for ProSe discovery and ProSe communication. The predetermined proximity criterion may be set as a control target of a wireless communication operator.

ProSe discovery is a process of determining what UE is proximate to another UE by using evolved universal terrestrial radio access (E-UTRA).

ProSe Communication is communication between proximate UEs that is performed via a communication path established between the UEs. The communication path may be established directly between the UEs, or routed via a local base station(s) (eNodeB).

FIG. 1 is a schematic view for explaining a wireless communication system according to an embodiment of the present disclosure.

Referring to FIG. 1, the wireless communication system 100 according to an embodiment may include a group communication service application server (GCS AS) 110, a base station 120, a relay terminal 130, and a terminal 140.

Only components related with the present embodiment from among the components of the wireless communication system 100 are shown in FIG. 1. It will be understood by one of ordinary skill in the art related with the present embodiment that general-use components other than the components illustrated in FIG. 1 may be further included.

The GCS AS 110 according to an embodiment may transmit an application signal and data to a group of terminals.

For example, the GCS AS 110 may transmit and receive a signal for session and group control to and from the terminal 140. The GCS AS 110 may also determine whether to transmit a downlink packet according to an LTE unicast technique or an evolved multimedia broadcast multicast service (eMBMS).

The GCS AS 110 may transmit a signal for session and group control and data related with content to a group of terminals via the base station 120 to which a specific cell coverage area has been allocated.

The base station 120 according to an embodiment generally denotes a station that communicates with at least one of the relay terminal 130 and the terminal 140, and may be referred to as another term, such as an evolved-NodeB (eNodeB), a base transceiver system (BTS), an access point, a femto base station (femto-eNB), a pico base station (pico-eNB), a home base station (Home eNB), or a relay. The base station 120 may provide at least one cell to at least one of the relay terminal 130 and the terminal 140. The cell may denote a geographical area where the base station 20 provides a communication service, or may denote a specific frequency band. The cell may denote a downlink frequency resource and an uplink frequency resource. Alternatively, the cell may denote a combination of a downlink frequency resource and an optional uplink frequency resource.

The relay terminal 130 according to an embodiment is a device within the cell coverage area of the base station 120. The relay terminal 130 may receive the application signal and the data from the base station 120. The relay terminal 130 may communicate with the terminal 140, which is located outside the cell coverage area. For example, the relay terminal 130 may transmit the signal or data acquired within the cell coverage area to the terminal 140.

When the terminal 140 changes the cell due to location movement while receiving an MBMS, a state in which the terminal 140 is unable to consecutively receive MBMSs may occur. The relay terminal 130 may transmit a temporary mobile group identity (TMGI) to the terminal 140 so that the terminal 140 that has moved outside the cell coverage area may receive an MBMS.

The MBMS may be cell-based or geography-based controlled or localized. An MBMS service area is a general term for an area where a specific MBMS is provided. For example, when an area where an MBMS A proceeds is called an eMBMS service area A, a network in the MBMS service area A may be in a state of transmitting the MBMS A. At this time, the terminal 140 may receive the MBMS A according to the capability of the terminal 140. The MBMS service area may be defined from the viewpoints of an application and a service regarding whether a specific service is provided or not in a certain area.

The terminal 140 according to an embodiment may have mobility. For example, the terminal 140 may be moved within the cell coverage area of the base station 120 and then may be moved outside the cell coverage area thereof. Outside the cell coverage area, the terminal 140 may transmit a TMGI monitoring request message including the TMGI of the terminal 140 to the relay terminal 130.

As the TMGI of the terminal 140 is authenticated by the relay terminal 130, the terminal 140 may receive ProSe data link layer group identity (hereinafter, referred to as a layer-2 group identification (ID)) for a proximity-based service. The layer-2 group ID is a data link layer identifier of a group that transmits MBMS traffic corresponding to TMGI.

The terminal 140 may also receive a signal and data related with an application from the outside of the cell coverage area via a wireless interface that is provided in a proximity-based service, by using the received layer-2 group ID.

A relay discovery additional information message in a wireless communication system may include an ID of the relay terminal 130, the TMGI, and the layer-2 group ID.

A single relay discovery additional information message may include an EGCI that the relay terminal 130 is camped on, at least one TMGI, and a layer-2 group ID corresponding to the at least one TMGI, within an allowed maximum message size.

Figure 2:
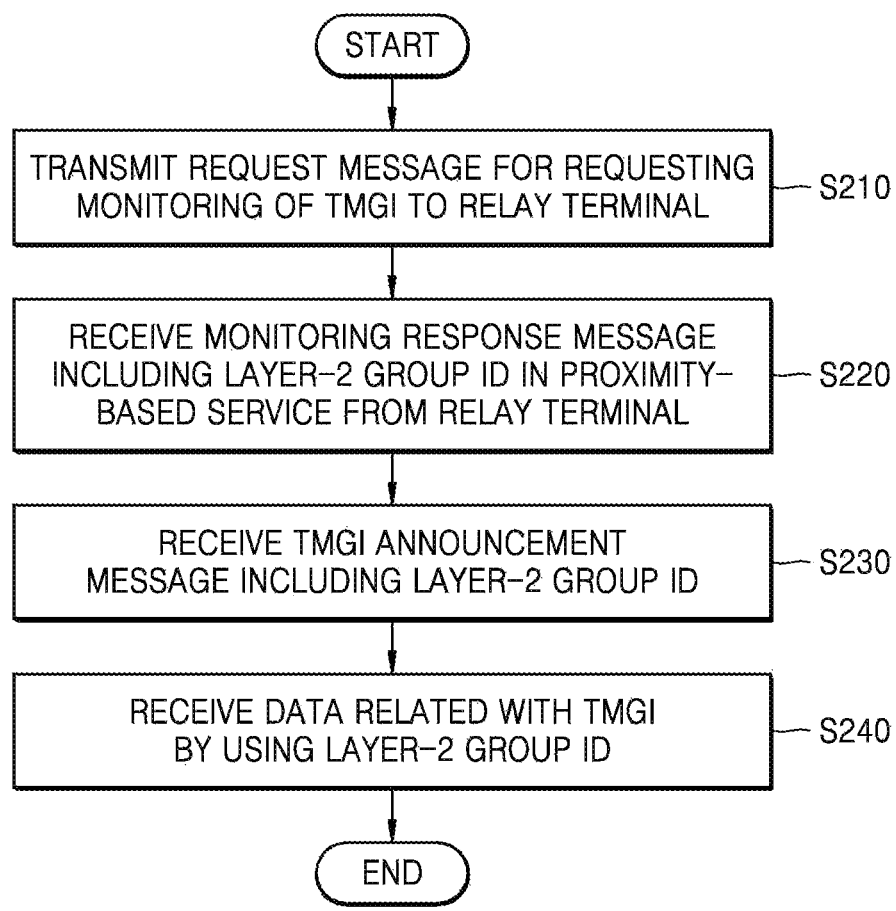
FIG. 2 is a flowchart of a method in which a terminal located outside a cell coverage area receives a signal and data of a group communication service application server (GCS AS), according to an embodiment of the present disclosure.

FIG. 2 is a flowchart of a method in which a terminal located outside the cell coverage area receives a signal and data of a GCS AS, according to an embodiment of the present disclosure.

Referring to FIG. 2, in operation S210, the terminal 140 outside the cell coverage area transmits a request message for requesting monitoring of the TMGI to a relay terminal located within the cell coverage area.

Before moving to the outside of the cell coverage area, the terminal 140 according to an embodiment may receive a user service description within the cell coverage area. The user service description may include a TMGI for receiving eMBMS content data, MBMS service area identification (MBMS SAI), and information about a frequency band.

The terminal 140 may select a relay terminal 130 from at least one relay terminal located within the cell coverage area. The terminal 140 may identify the relay terminal 130 via a message transmitted by the relay terminal 130. However, this is only an embodiment, and a method in which the terminal 140 selects the relay terminal 130 is not limited thereto.

As the terminal 140 according to an embodiment moves outside the cell coverage area, the terminal 140 may transmit a request message requesting TMGI monitoring to the selected relay terminal 130 in order to receive the eMBMS content data. The request message may include the TMGI of the terminal 140 and at least one MBMS SAI. The terminal 140 may acquire the TMGI of the terminal 140 and the at least one MBMS SAI from the user service description.

However, this is only an embodiment. According to an embodiment, the request message may further include the layer-2 group ID previously received by the terminal 140 for a proximity-based service. According to an embodiment, the request message may further include the layer-2 group ID or relay layer-2 group ID previously set for data reception via the relay terminal 130, in addition to the TMGI and the at least one MBMS SAI.

In operation S220, the terminal 140 receives a monitoring response message including layer-2 group ID in a proximity-based service from the relay terminal 130.

As the relay terminal 130 detects at least one of the at least one MBMS SAI included in the request message of the terminal 140, the terminal 140 may receive the monitoring response message from the relay terminal 130. The monitoring response message may include the layer-2 group ID for a proximity-based service and information about a TMGI monitoring refresh timer. However, this is only an embodiment, and information included in the monitoring response message is not limited thereto.

In operation S230, as the relay terminal 130 detects the TMGI of the terminal 140 from a pre-stored TMGI list, the terminal 140 receives a TMGI announcement message including the layer-2 group ID.

According to an embodiment, the TMGI announcement message may be received by the terminal 140 on a regular interval smaller than the TMGI monitoring refresh timer. The TMGI included in the TMGI announcement message may be used as reference information for relay terminal selection by other terminals.

According to an embodiment, the TMGI announcement message may include the layer-2 group ID or the relay layer-2 group ID.

In operation S240, the terminal 140 receives data related with the TMGI by using the layer-2 group ID.

The terminal 140 according to an embodiment may receive the data related with the TMGI via a wireless interface that is provided by a proximity-based service, by using the layer-2 group ID. The wireless interface may be a wireless interface defined for data transmission or reception between devices in a proximity-based service. For example, the wireless interface may be PC5.

Figure 3:
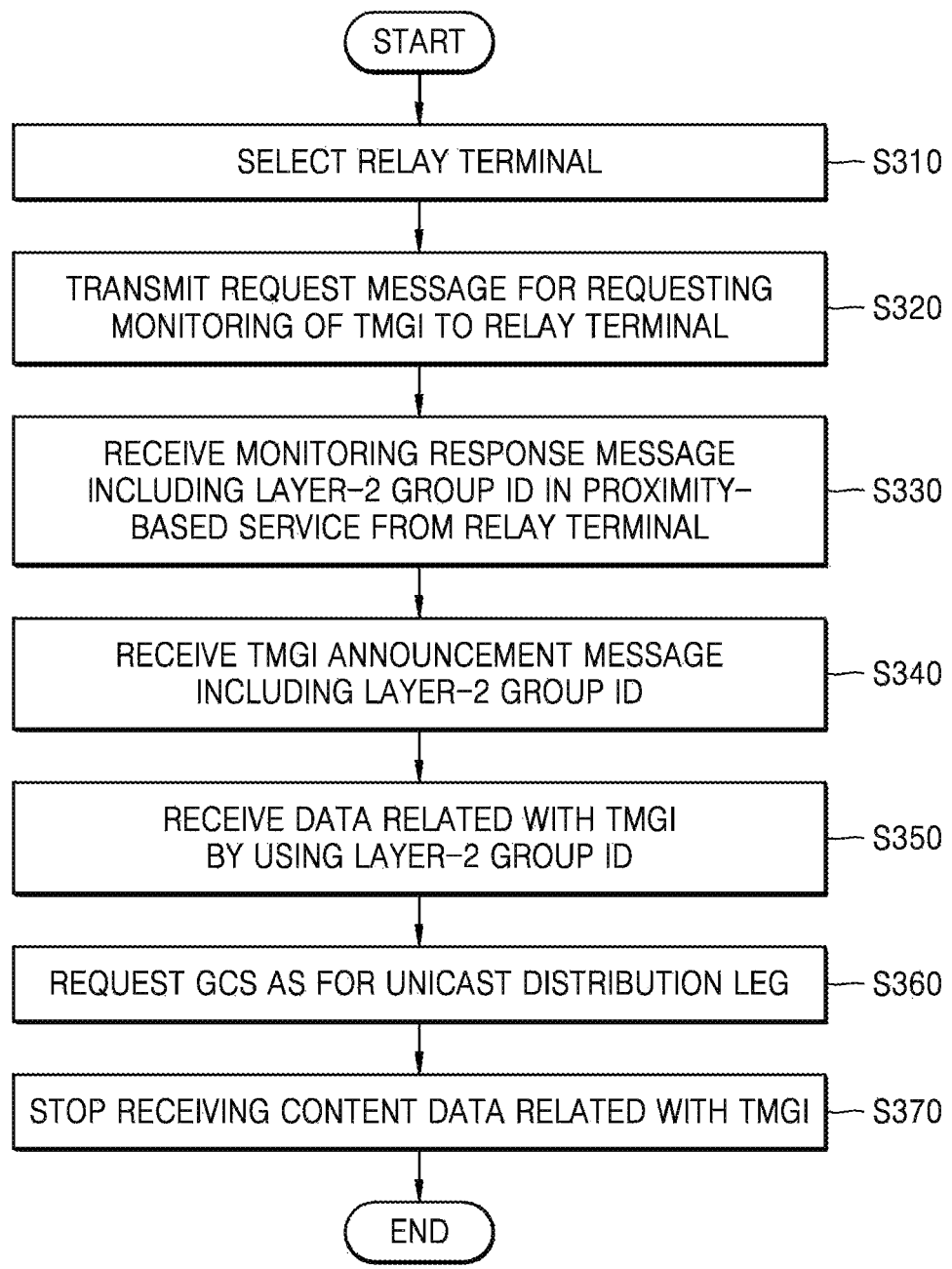
FIG. 3 is a detailed flowchart of a method in which a terminal outside the cell coverage area receives a signal and data of the GCS AS, according to an embodiment of the present disclosure.

FIG. 3 is a detailed flowchart of a method in which a terminal outside a cell coverage area receives a signal and data of a GCS AS, according to an embodiment of the present disclosure.

Referring to FIG. 3, in operation S310, the terminal 140 may select the relay terminal 130 for receiving a proximity-based service.

The terminal 140 according to an embodiment may identify at least one relay terminal located within the cell coverage area, via a message transmitted by the at least one relay terminal. The terminal 140 may select one of the at least one relay terminal.

The terminal 140 according to an embodiment may receive a user service description related with a group communication application service, within the cell coverage area. The user service description may include at least one of TMGI, frequency band information, and at least one MBMS service area ID which are related with the eMBMS content data that is to be received.

In operation S320, the terminal 140 located outside the cell coverage area may transmit a monitoring request message for requesting monitoring of the TMGI to a relay terminal located within the cell coverage area.

The monitoring request message may include the TMGI of the terminal 140 and at least one MBMS SAI. However, this is only an embodiment. According to an embodiment, the monitoring request message may further include the layer-2 group ID previously received by the terminal 140 for a proximity-based service. According to an embodiment, the monitoring request message may include the layer-2 group ID or the relay layer-2 group ID preset for data reception via the relay terminal 130, in addition to the TMGI and the at least one MBMS SAI.

Operation S320 may correspond to operation S210 described above with reference to FIG. 2.

In operation S330, the terminal 140 receives a monitoring response message including layer-2 group ID in a proximity-based service from the relay terminal 130.

The relay terminal 130 according to an embodiment may acquire a list of MBMS SAI that is broadcasted within a cell. The relay terminal 130 may detect the at least one MBMS SAI, included in the monitoring request message received by the terminal 140, from the list.

As the relay terminal 130 detects the at least one MBMS SAI included in the monitoring request message from the list, the terminal 140 may receive the monitoring response message from the relay terminal 130.

The monitoring response message may include the layer-2 group ID for a proximity-based service and information about a TMGI monitoring refresh timer. The layer-2 group ID may be, for example, Prose Layer 2 Group ID traffic. The layer-2 group ID may be used to provide the eMBMS content data related with the TMGI of a terminal to the terminal.

The TMGI monitoring refresh timer may be selected by the relay terminal 130. When the TMGI monitoring refresh timer is expired and the TMGI is necessary, the terminal 140 may transmit the monitoring request message to the relay terminal 130. When the TMGI monitoring refresh timer is expired and the terminal 140 does not transmit the monitoring request message, the relay terminal 130 may stop monitoring the TMGI and may not transmit the data related with the TMGI.

In operation S340, as the relay terminal 130 detects the TMGI of the terminal 140 from the pre-stored TMGI list, the terminal 140 receives a TMGI announcement message including the layer-2 group ID.

The relay terminal 130 according to an embodiment may broadcast the availability of the TMGI and the layer-2 group ID by transmitting the TMGI announcement message. The TMGI announcement message may be transmitted by the relay terminal 130 to the terminal 140, on a regular interval that is shorter than the TMGI monitoring refresh timer. The TMGI included in the TMGI announcement message may be referred to when other terminals select a relay terminal.

In operation S350, the terminal 140 may receive the data related with the TMGI by using the layer-2 group ID.

The terminal 140 according to an embodiment may receive the data related with the TMGI via a PC5 that is provided by a proximity-based service, by using the layer-2 group ID.

The terminal 140 according to an embodiment may release a unicast distribution leg. Herein, the unicast distribution leg indicates a connection that is used to transfer data in a unicast mode. For example, the terminal 140 may release a unicast distribution leg that is set between the terminal 140 and the GCS AS. For another example, the terminal 140 may release a unicast distribution leg that is set between the terminal 140 and the relay terminal 130.

A terminal belonging to the TMGI included in the TMGI announcement message may receive the eMBMS content data by using a group ID, before a TMGI monitoring request and response procedure is completed.

In operation S360, the terminal 140 may request the GCS AS for the unicast distribution leg.

The terminal 140 according to an embodiment may fail to receive the TMGI announcement message, as the TMGI monitoring refresh timer is expired. When TMGI monitoring is not continuously necessary, the terminal 140 may not transmit the monitoring request message of operation S320 to the relay terminal 130.

According to an embodiment, when the TMGI monitoring is continuously necessary, the terminal 140 may transmit the monitoring request message to the relay terminal 130.

In operation S370, the terminal 140 may stop receiving content data via the PC5, which is provided in a proximity-based service.

The order of operations S360 and S370 may be changed according to a time point when reception of the eMBMS content data within the cell coverage area fails.

Figure 4:
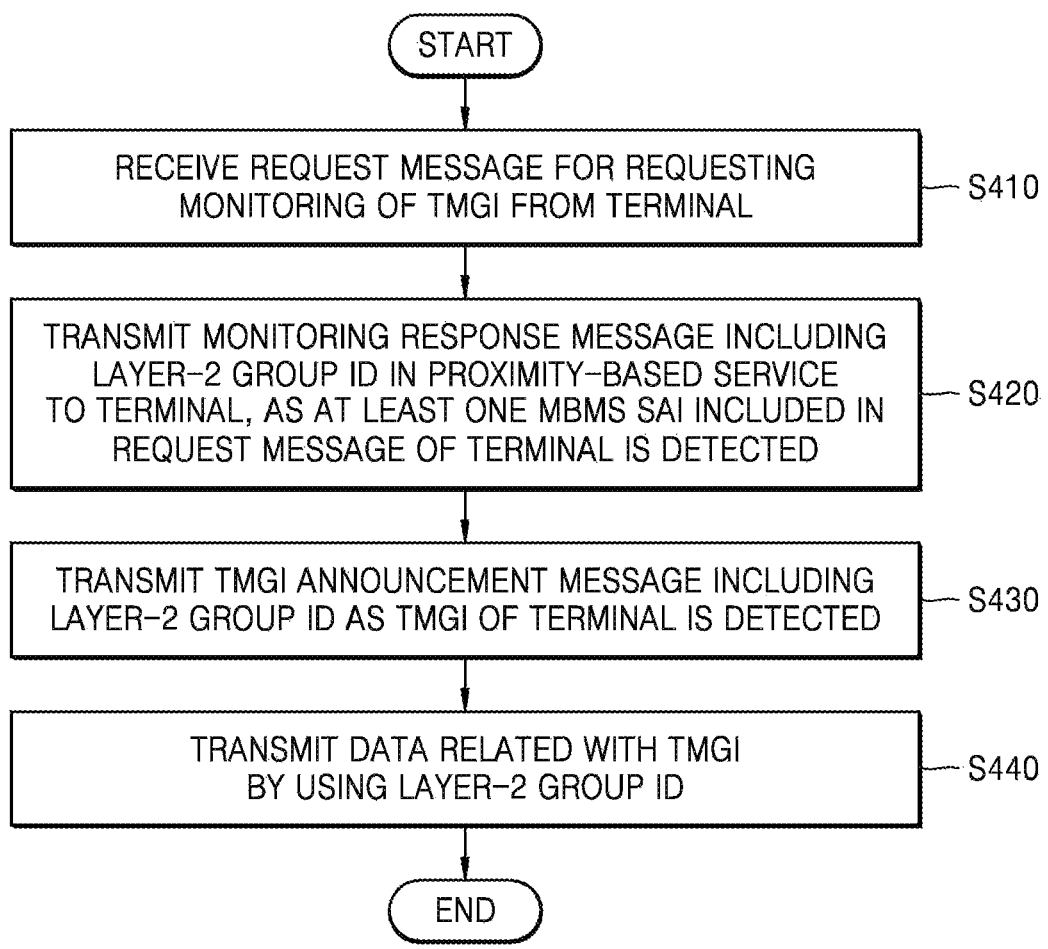
FIG. 4 is a flowchart of a method in which a relay terminal transmits a temporal mobile group identity (TMGI) and a layer-2 group identity (ID) to a terminal located outside a cell coverage area, according to an embodiment of the present disclosure.

FIG. 4 is a flowchart of a method in which a relay terminal transmits the TMGI and a layer-2 group ID to a terminal located outside the cell coverage area, according to an embodiment of the present disclosure.

Referring to FIG. 4, in operation S410, the relay terminal 130 receives a request message for requesting monitoring of the TMGI from the terminal 140 located outside the cell coverage area. The request message may include the TMGI of the terminal 140 and at least one MBMS SAI.

However, this is only an embodiment. According to an embodiment, the request message may further include the layer-2 group ID previously received by the terminal 140 for a proximity-based service. According to an embodiment, the request message may further include the layer-2 group ID or relay layer-2 group ID previously set for data reception via the relay terminal 130, in addition to the TMGI and the at least one MBMS SAI.

In operation S420, as the at least one MBMS SAI included in the request message of the terminal 140 is detected from an MBMS SAI list, the relay terminal 130 transmits a monitoring response message including layer-2 group ID in a proximity-based service to the terminal 140.

The monitoring response message may include the layer-2 group ID for a proximity-based service and information about a TMGI monitoring refresh timer. However, this is only an embodiment, and information included in the monitoring response message is not limited thereto.

In operation S430, as the relay terminal 130 detects the TMGI of the terminal 140, the relay terminal 130 transmits a TMGI announcement message including the layer-2 group ID.

According to an embodiment, the relay terminal 130 may transmit the TMGI announcement message to the terminal 140, on a regular interval that is smaller than the TMGI monitoring refresh timer. The TMGI included in the TMGI announcement message may be used as reference information for relay terminal selection by other terminals.

According to an embodiment, the TMGI announcement message may include the layer-2 group ID or the relay layer-2 group ID.

In operation S440, the relay terminal 130 transmits data related with the TMGI by using the layer-2 group ID.

The relay terminal 130 according to an embodiment may transmit the data related with the TMGI to the terminal 140 via a wireless interface that is provided by a proximity-based service, by using the layer-2 group ID. For example, the wireless interface may be PC5.

Figure 5:
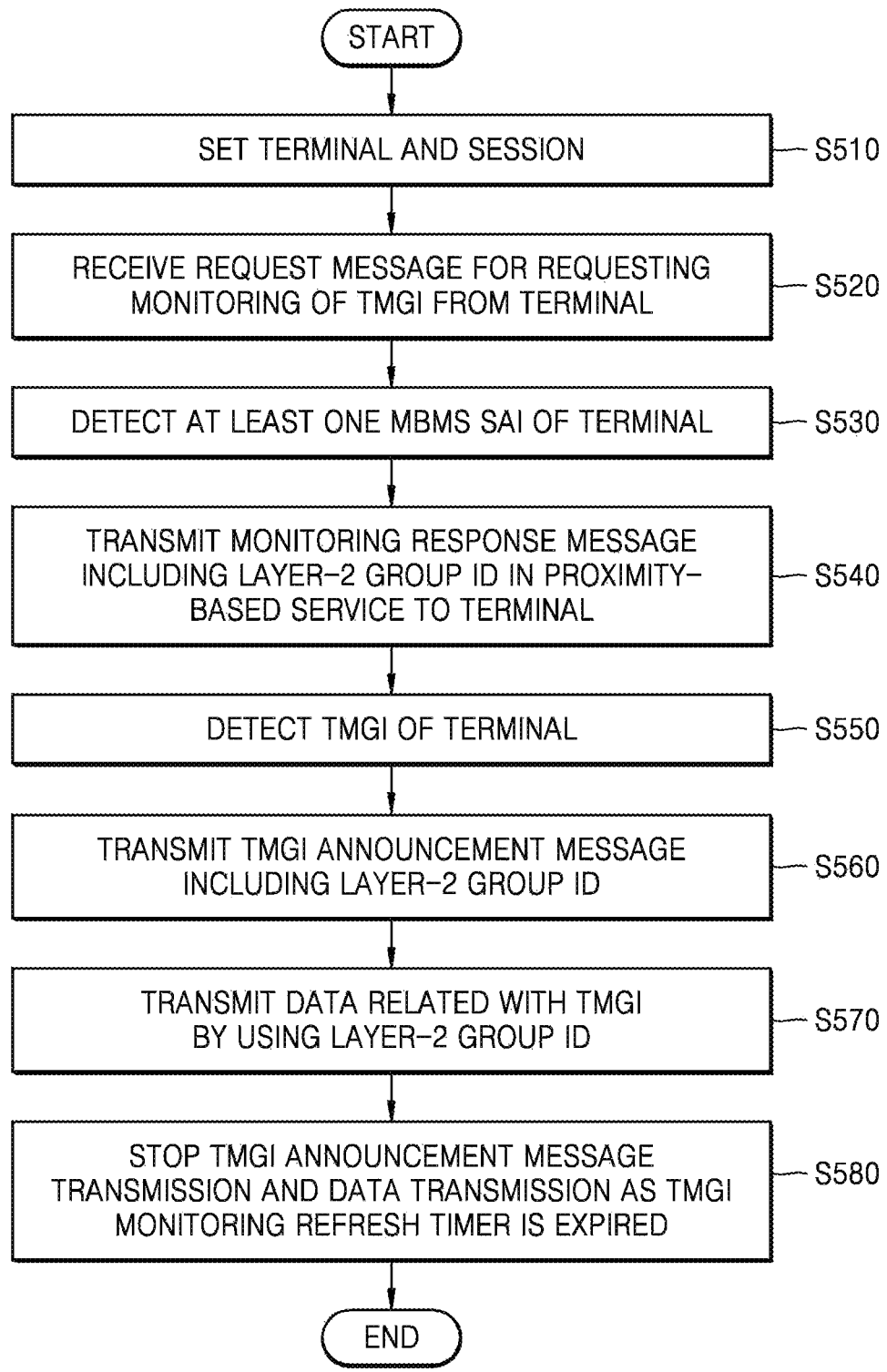
FIG. 5 is a detailed flowchart of a method in which a relay terminal transmits a TMGI and a layer-2 group ID to a terminal located outside a cell coverage area, according to an embodiment of the present disclosure.

FIG. 5 is a detailed flowchart of a method in which a relay terminal transmits the TMGI and a layer-2 group ID to a terminal located outside the cell coverage area, according to an embodiment of the present disclosure.

Referring to FIG. 5, in operation S510, the relay terminal 130 may set the terminal 140 and a session.

In operation S520, the relay terminal 130 receives a request message for requesting monitoring of the TMGI from the terminal 140 located outside the cell coverage area. The request message may include the TMGI of the terminal 140 and at least one MBMS SAI.

Operation S520 may correspond to operation S410 of FIG. 4.

In operation S530, the relay terminal 130 may detect the at least one MBMS SAI included in the request message of the terminal 140 from the MBMS SAI list.

In operation S540, as the at least one MBMS SAI included in the request message of the terminal 140 is detected from the MBMS SAI list, the relay terminal 130 may transmit a monitoring response message including layer-2 group ID in a proximity-based service to the terminal 140.

Operation S540 may correspond to operation S420 of FIG. 4.

In operation S550, the relay terminal 130 may detect the TMGI of the terminal 140. For example, the relay terminal 130 may detect the TMGI of the terminal 140 from among at least one TMGI that is broadcasted within the cell coverage area.

In operation S560, as the relay terminal 130 detects the TMGI of the terminal 140, the relay terminal 130 transmits a TMGI announcement message including the layer-2 group ID.

According to an embodiment, the relay terminal 130 may transmit the TMGI announcement message to the terminal 140, on a regular interval that is smaller than the TMGI monitoring refresh timer. The TMGI included in the TMGI announcement message may be used as reference information for relay terminal selection by other terminals.

According to an embodiment, the TMGI announcement message may include the layer-2 group ID or the relay layer-2 group ID.

In operation S570, the relay terminal 130 transmits data related with the TMGI by using the layer-2 group ID.

In operation S580, the relay terminal 130 may stop the TMGI announcement message transmission and the data transmission as the TMGI monitoring refresh timer is expired.

The relay terminal 130 according to an embodiment may stop the TMGI announcement message transmission and the data transmission, when the relay terminal 130 receives no monitoring request messages from the terminal 140 after the TMGI monitoring refresh timer is ended.

According to an embodiment, when a monitoring request message is transmitted by the terminal 140 after the TMGI monitoring refresh timer is ended, the relay terminal 130 may transmit the TMGI announcement message and the data to the terminal 140 until a next TMGI monitoring refresh timer is expired.

Figure 6:
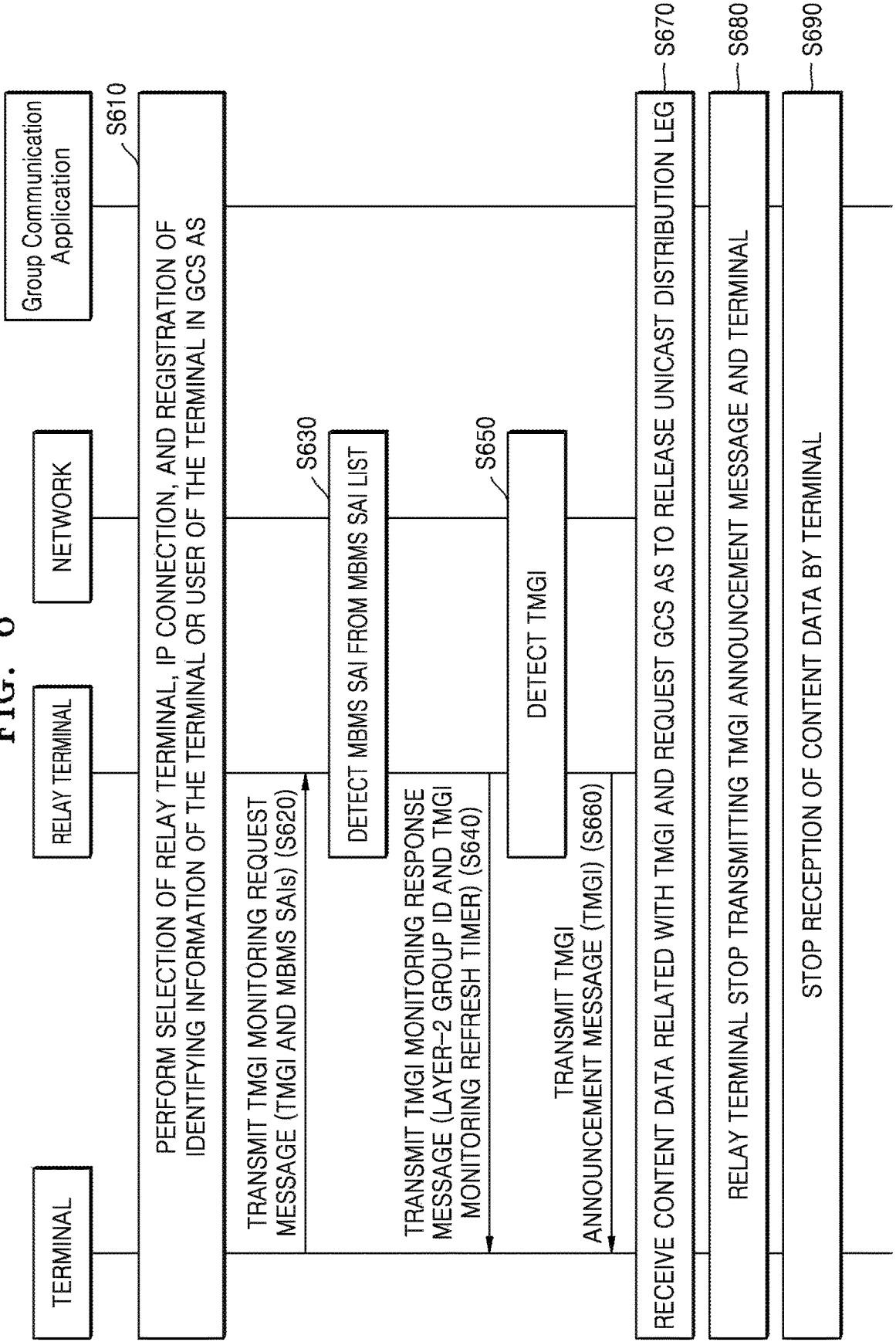
FIG. 6 is a flowchart of a method in which a terminal located outside the cell coverage area and a relay terminal to transmit or receive a signal and data of the GCS AS to or from each other, according to an embodiment of the present disclosure.

FIG. 6 is a flowchart of a method in which a terminal located outside a cell coverage area and a relay terminal transmit or receive a signal and data of a GCS AS to or from each other, according to an embodiment of the present disclosure.

Referring to FIG. 6, in operation S610, the terminal 140 may perform selection of the relay terminal 130 for receiving a proximity-based service, internet protocol (IP) connection, and registration of identifying information of the terminal 140 in the GCS AS.

The terminal 140 according to an embodiment may receive a user service description related with a group communication application service, after a one-to-one communication session between the terminal 140 and the relay terminal 130 is set. When the terminal 140 selects a relay session before moving to the outside of the cell coverage area, the terminal 140 may receive the user service description after session setting. However, this is only an embodiment, and the terminal 140 may receive the user service description before session setting.

The terminal 140 located outside the cell coverage area transmits a request message for requesting monitoring of the TMGI to a relay terminal located within the cell coverage area.

In operation S620, the terminal 140 located outside the cell coverage area may transmit a monitoring request message for requesting monitoring of the TMGI to the relay terminal 130 located within the cell coverage area.

In operation S630, the relay terminal 130 may detect an MBMS SAI included in the request message of the terminal 140 from an MBMS SAI list. The relay terminal 130 according to an embodiment may receive an MBMS SAI list that is broadcasted from the cell on which the relay terminal 130 is camped. The relay terminal 130 may determine whether the MBMS SAI included in the request message of the terminal 140 exists in the received MBMS SAI list.

In operation S640, as the MBMS SAI included in the request message of the terminal 140 is detected from the MBMS SAI list, the relay terminal 130 may transmit a monitoring response message including layer-2 group ID in a proximity-based service to the terminal 140.

In operation S650, the relay terminal 130 may detect the TMGI of the terminal 140. For example, the relay terminal 130 may detect the TMGI of the terminal 140 from among at least one TMGI that is broadcasted within the cell coverage area.

In operation S660, as the relay terminal 130 detects the TMGI of the terminal 140, the relay terminal 130 may transmit a TMGI announcement message including the layer-2 group ID.

According to an embodiment, the relay terminal 130 may transmit the TMGI announcement message to the terminal 140, on a regular interval that is smaller than the TMGI monitoring refresh timer.

In operation S670, the terminal 140 may receive content data related with the TMGI and request the GCS AS to release a unicast distribution leg.

In operation S680, the relay terminal 130 may stop transmitting the TMGI announcement message and request a unicast distribution leg.

In operation S690, reception of the content data by the terminal 140 may be stopped. The terminal 140 according to an embodiment may fail to receive the TMGI announcement message, as the TMGI monitoring refresh timer is expired. When TMGI monitoring is not continuously necessary, the terminal 140 may not transmit the monitoring request message of operation S620 to the relay terminal 130.

The order of operations S680 and S690 may be changed according to a time point when reception of the eMBMS content data within the cell coverage fails.

Figure 7:
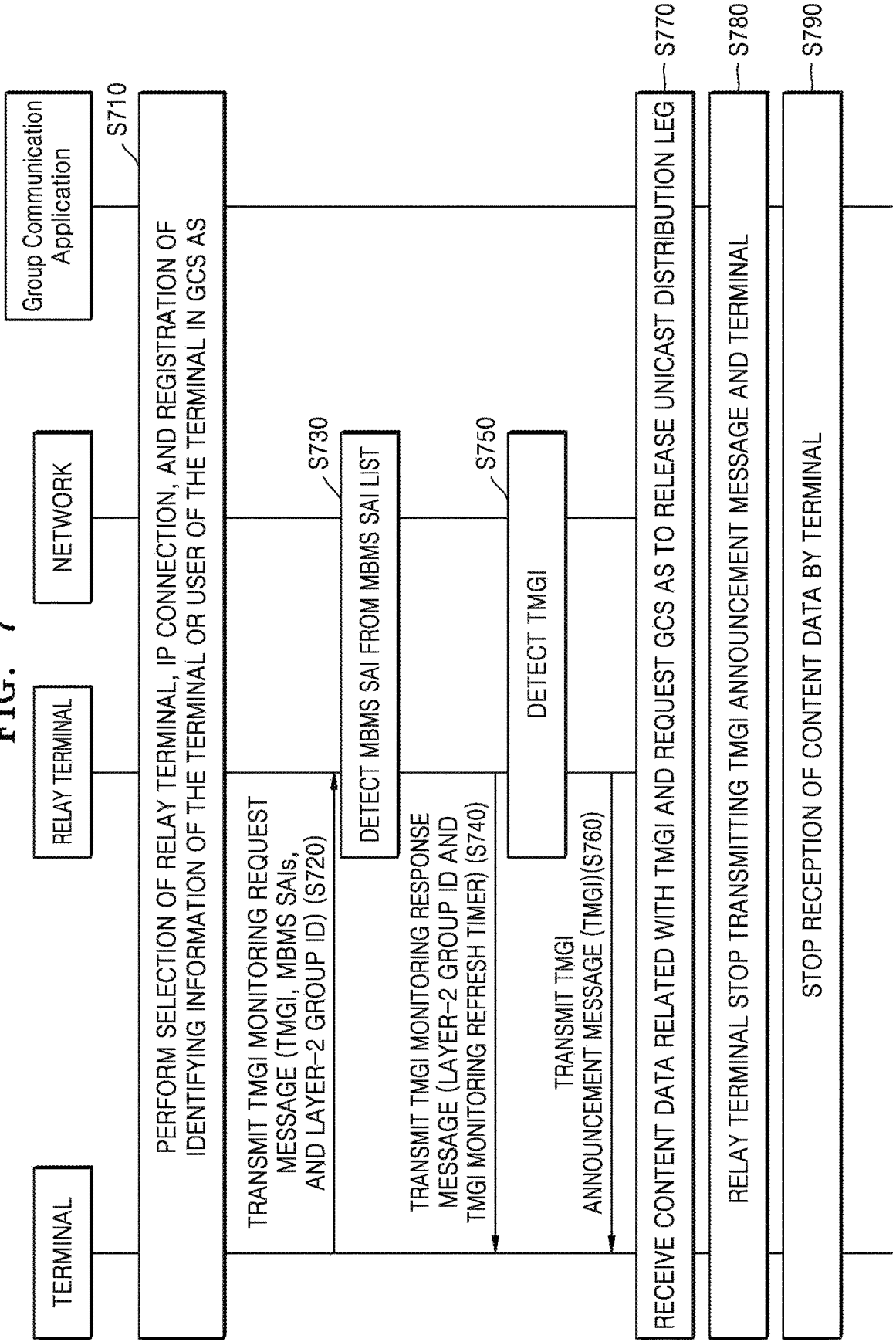
FIG. 7 is a flowchart of a method in which a terminal located outside a cell coverage area and a relay terminal to transmit or receive a signal and data of the GCS AS to or from each other, according to an embodiment of the present disclosure.

FIG. 7 is a flowchart of a method in which a terminal located outside the cell coverage area and a relay terminal transmit or receive a signal and data of a GCS AS to or from each other, according to an embodiment of the present disclosure.

Referring to FIG. 7, in operation S710, the terminal 140 may perform selection of the relay terminal 130 for receiving a proximity-based service, IP connection, and registration of identifying information of the terminal 140 or the user of the terminal 140 in the GCS AS.

The terminal 140 located outside the cell coverage area transmits a request message for requesting monitoring of the TMGI to a relay terminal located within the cell coverage.

In operation S720, the terminal 140 located outside the cell coverage area may transmit a monitoring request message for requesting monitoring of the TMGI to the relay terminal 130 located within the cell coverage area. The request message may include the TMGI of the terminal 140, TMGI MBMS SAIs, and layer-2 group ID.

In operation S730, the relay terminal 130 may detect an MBMS SAI included in the request message of the terminal 140 from an MBMS SAI list.

Operation S730 may correspond to operation S630 described above with reference to FIG. 6.

In operation S740, as the MBMS SAI included in the request message of the terminal 140 is detected from the MBMS SAI list, the relay terminal 130 may transmit a monitoring response message including layer-2 group ID in a proximity-based service to the terminal 140.

Operation S740 may correspond to operation S640 described above with reference to FIG. 6.

In operation S750, the relay terminal 130 may detect the TMGI of the terminal 140.

Operation S750 may correspond to operation S650 described above with reference to FIG. 6.

In operation S760, as the relay terminal 130 detects the TMGI of the terminal 140, the relay terminal 130 may transmit a TMGI announcement message including the layer-2 group ID.

Operation S760 may correspond to operation S660 described above with reference to FIG. 6.

In operation S770, the terminal 140 may receive content data related with the TMGI and request the GCS AS to release a unicast distribution leg.

Operation S770 may correspond to operation S670 described above with reference to FIG. 6.

In operation S780, the relay terminal 130 may stop transmitting the TMGI announcement message and request a unicast distribution leg.

Operation S780 may correspond to operation S680 described above with reference to FIG. 6.

In operation S790, reception of the content data by the terminal 140 may be stopped.

Operation S790 may correspond to operation S690 described above with reference to FIG. 6.

The order of operations S780 and S790 may be changed according to a time point when reception of the eMBMS content data within the cell coverage area fails.

Figure 8:
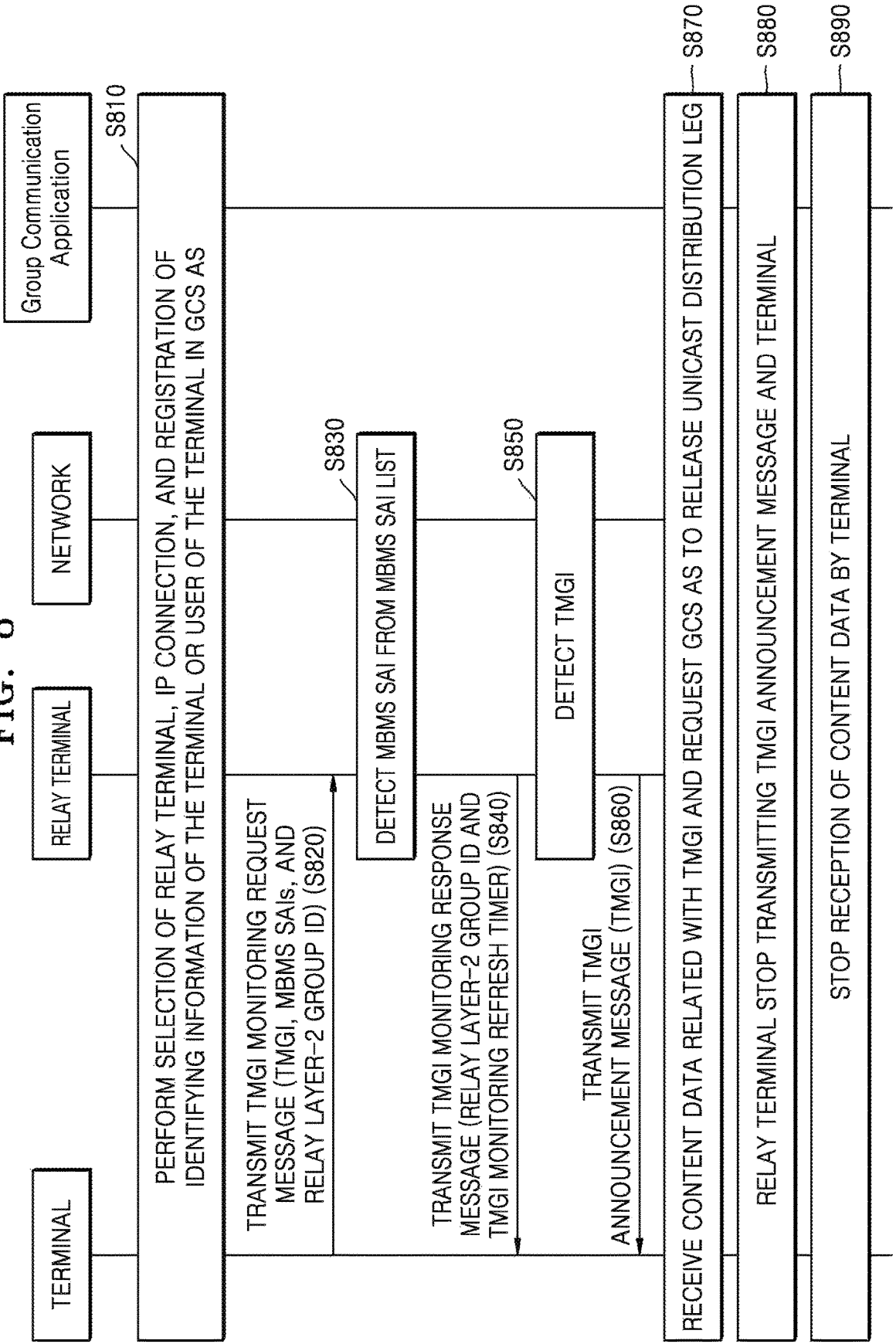
FIG. 8 is a flowchart of a method in which a terminal located outside a cell coverage area and a relay terminal to transmit or receive a signal and data of the GCS AS to or from each other, according to an embodiment of the present disclosure.

FIG. 8 is a flowchart of a method in which a terminal located outside a cell coverage area and a relay terminal transmit or receive a signal and data of a GCS AS to or from each other, according to an embodiment of the present disclosure.

Referring to FIG. 8, in operation S810, the terminal 140 may perform selection of the relay terminal 130 for receiving a proximity-based service, IP connection, and registration of identifying information of the terminal 140 or user of the terminal 140 in the GCS AS.

In operation S820, the terminal 140 located outside the cell coverage area may transmit a monitoring request message for requesting monitoring of the TMGI to the relay terminal 130 located within the cell coverage area. The request message may include the TMGI of the terminal 140, TMGI MBMS SAIs, and relay layer-2 group ID.

In operation S830, the relay terminal 130 may detect an MBMS SAI included in the request message of the terminal 140 from an MBMS SAI list.

Operation S830 may correspond to operation S630 described above with reference to FIG. 6.

In operation S840, as the MBMS SAI included in the request message of the terminal 140 is detected from the MBMS SAI list, the relay terminal 130 may transmit a monitoring response message including relay layer-2 group ID in a proximity-based service to the terminal 140.

Operation S840 may correspond to operation S640 described above with reference to FIG. 6.

In operation S850, the relay terminal 130 may detect the TMGI of the terminal 140.

Operation S850 may correspond to operation S650 described above with reference to FIG. 6.

In operation S860, as the relay terminal 130 detects the TMGI of the terminal 140, the relay terminal 130 may transmit a TMGI announcement message including the layer-2 group ID.

Operation S860 may correspond to operation S650 described above with reference to FIG. 6.

In operation S870, the terminal 140 may receive content data related with the TMGI and request the GCS AS to release a unicast distribution leg.

Operation S870 may correspond to operation S670 described above with reference to FIG. 6.

In operation S880, the relay terminal 130 may stop transmitting the TMGI announcement message and request a unicast distribution leg.

Operation S880 may correspond to operation S680 described above with reference to FIG. 6.

In operation S890, reception of the content data by the terminal 140 may be stopped.

Operation S890 may correspond to operation S690 described above with reference to FIG. 6.

The order of operations S880 and S890 may be changed according to a time point when reception of the eMBMS content data within the cell coverage area fails.

Figure 9:
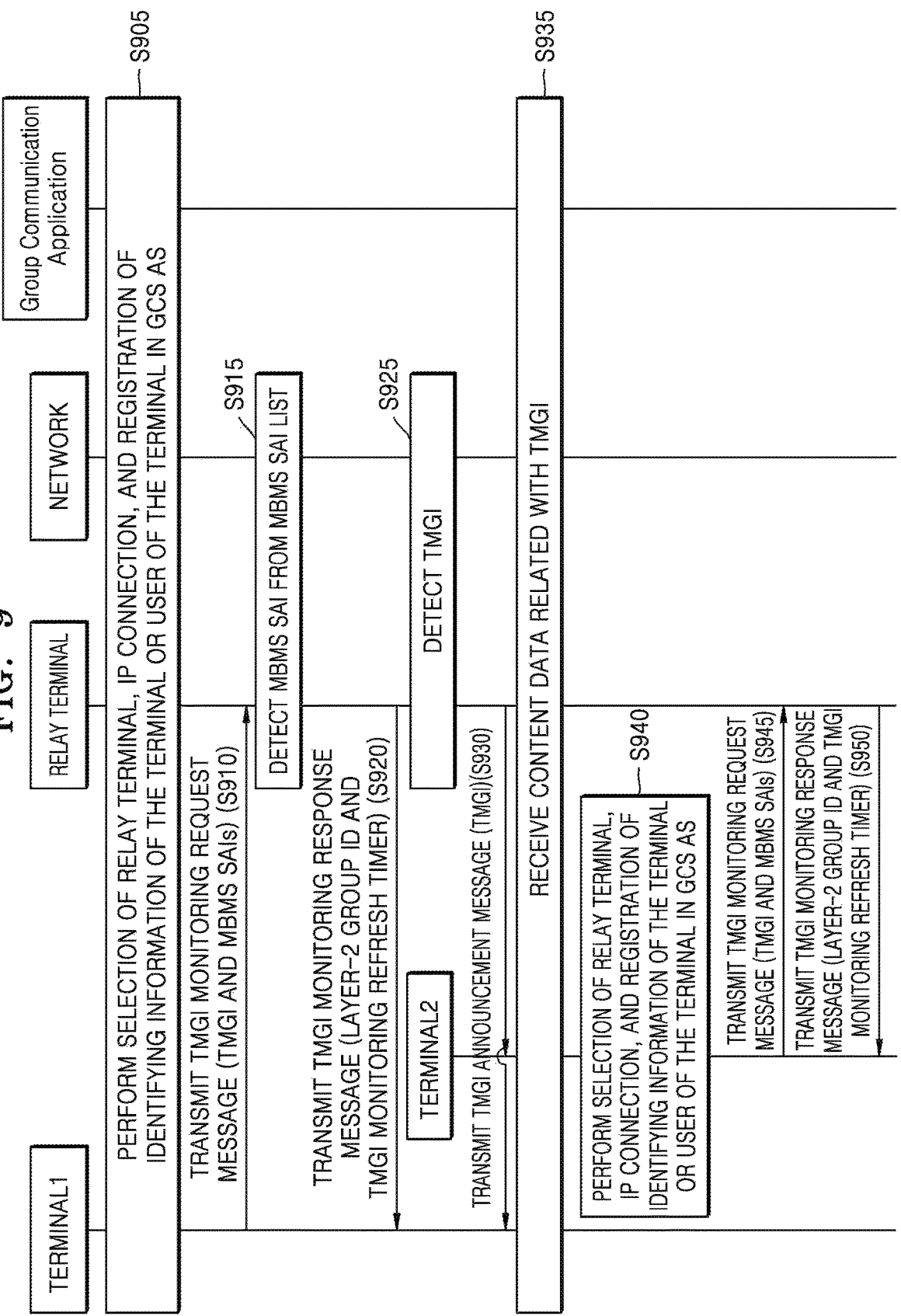
FIG. 9 is a flowchart of a method in which terminals 1 and 2 located outside a cell coverage area and a relay terminal transmit or receive a signal and data of a GCS AS to or from each other, according to an embodiment of the present disclosure.

FIG. 9 is a flowchart of a method in which terminals 1 and 2 located outside a cell coverage area and a relay terminal transmit or receive a signal and data of a GCS AS to or from each other, according to an embodiment of the present disclosure.

Referring to FIG. 9, in operation S905, the terminal 1 may perform selection of the relay terminal 130 for receiving a proximity-based service, IP connection, and registration of identifying information of the terminal 140 or a user of the terminal 140 in the GCS AS.

The terminal 1 according to an embodiment may set a one-to-one communication session with the relay terminal 130 before moving to the outside of the cell coverage area. The terminal 1 may provide a user service description related with a group communication application service, before or after the one-to-one communication session with the relay terminal 130 is set.

In operation S910, the terminal 1 located outside the cell coverage area may transmit a request message for requesting monitoring of TMGI to the relay terminal 130 located within the cell coverage area.

In operation S915, the relay terminal 130 may detect an MBMS SAI included in the request message of the terminal 1 from an MBMS SAI list. The relay terminal 130 according to an embodiment may receive an MBMS SAI list that is broadcasted from the cell on which the relay terminal 130 is camped. The relay terminal 130 may determine whether the MBMS SAI included in the request message of the terminal 1 exists in the received MBMS SAI list.

In operation S920, as the MBMS SAI included in the request message of the terminal 1 is detected from the MBMS SAI list, the relay terminal 130 may transmit a monitoring response message including layer-2 group ID in a proximity-based service to the terminal 1. The layer-2 group ID may be arbitrarily selected by the relay terminal 130. According to an embodiment, the layer-2 group ID may be previously stored in the relay terminal 130.

In operation S925, the relay terminal 130 may detect the TMGI of the terminal 1. For example, the relay terminal 130 may detect the TMGI of the terminal 1 from among at least one TMGI that is broadcasted within the cell coverage area.

In operation S930, as the relay terminal 130 detects the TMGI of the terminal 1, the relay terminal 130 may transmit a TMGI announcement message including the layer-2 group ID.

According to an embodiment, the terminal 2 may receive the TMGI announcement message from the relay terminal 130.

In operation S935, the terminal 1 and the terminal 2 may receive TMGI-related content data. The terminal 2 may receive the TMGI-related content data via the TMGI announcement message received in operation S930, without undergoing a TMGI monitoring process.

In operation S940, the terminal 2 may perform selection of the relay terminal 130 for receiving a proximity-based service, IP connection, and registration of identifying information of the terminal 140 or the user of the terminal 140 in the GCS AS.

In operation S945, the terminal 2 located outside the cell coverage area may transmit a monitoring request message for requesting monitoring of TMGI to the relay terminal 130 located within the cell coverage area.

In operation S950, as an MBMS SAI included in the monitoring request message of the terminal 2 is detected, the relay terminal 130 may transmit a monitoring response message including layer-2 group ID in a proximity-based service to the terminal 2.

Operation S935 and operations S940-S950 may be performed simultaneously. According to an embodiment, the order of operations S940-S950 and operation S935 may be changed.

Figure 10:
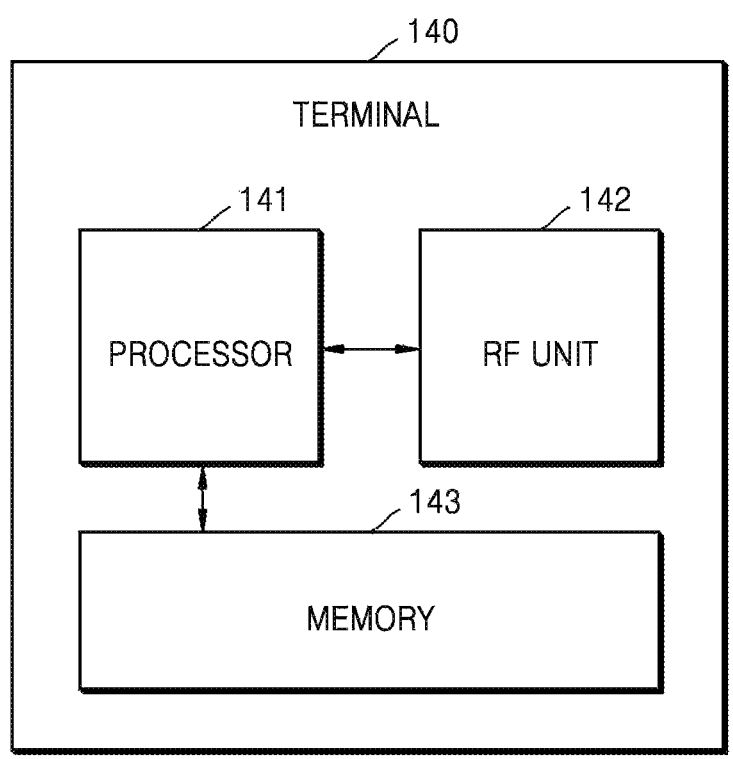
FIG. 10 is a block diagram of a terminal according to an embodiment of the present disclosure.

FIG. 10 is a block diagram of a terminal, according to an embodiment of the present disclosure.

Referring to FIG. 10, the terminal 140 includes a processor 141, a radio frequency (RF) unit 142 and a memory 143.

The processor 141 implements a proposed function, process, and/or method. Operations of the terminal 140 may be implemented by the processor 141. The processor 141 transmits a request message for requesting monitoring of TMGI to the relay terminal 130.

The processor 141 receives a monitoring response message including layer-2 group ID in a proximity-based service from the relay terminal 130.

As the relay terminal 130 detects at least one of at least one MBMS SAI included in the request message of the terminal 140, the processor 141 may receive the monitoring response message from the relay terminal 130.

As the relay terminal 130 detects the TMGI of the terminal 140 from a pre-stored TMGI list, the processor 141 according to an embodiment receives a TMGI announcement message including the layer-2 group ID.

The RF unit 142 is connected to the processor 141 and transmits and/or receives a wireless signal.

The memory 143 is connected to the processor 141 and stores a protocol or parameter for an operation. For example, the memory 143 may store a user service description.

Figure 11:
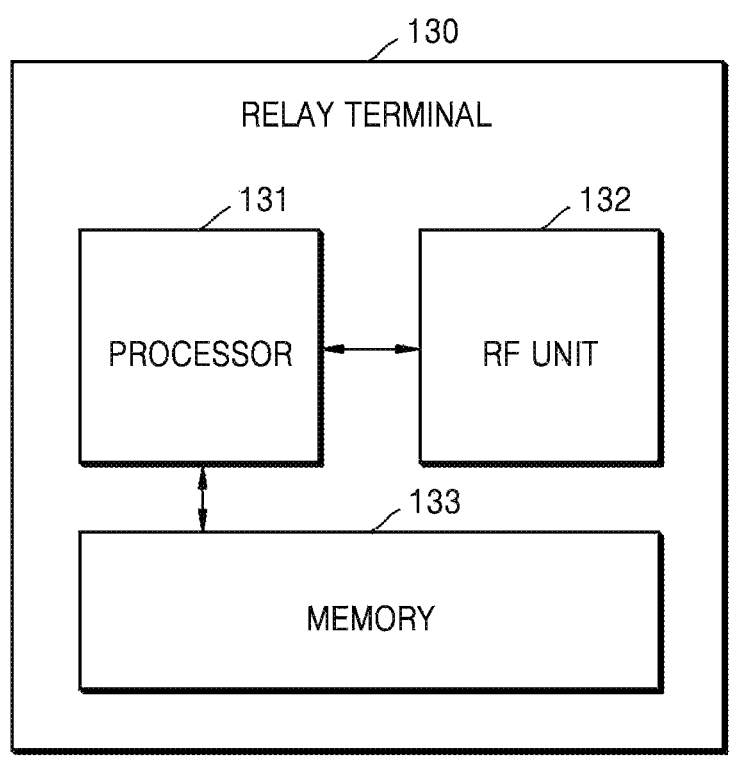
FIG. 11 is a block diagram of a relay terminal according to an embodiment of the present disclosure.

FIG. 11 is a block diagram of a relay terminal, according to an embodiment according to the present disclosure.

Referring to FIG. 11, the relay terminal 130 may include a processor 131, an RF unit 132, and a memory 133.

The processor 131 implements a proposed function, process, and/or method. Operations of the relay terminal 130 may be implemented by the processor 131. The processor 131 receives a request message for requesting monitoring of TMGI from the terminal 140 located outside the cell coverage area.

As an MBMS SAI included in the request message of the terminal 140 is detected from an MBMS SAI list, the processor 131 transmits a monitoring response message including layer-2 group ID in a proximity-based service to the terminal 140.

As the processor 131 detects the TMGI of the terminal 140, the processor 131 transmits a TMGI announcement message including the layer-2 group ID. The processor 131 may transmit the TMGI announcement message to the terminal 140, on a regular interval that is smaller than the TMGI monitoring refresh timer.

The processor 131 transmits data related with the TMGI by using the layer-2 group ID.

The RF unit 132 is connected to the processor 131 and transmits and/or receives a wireless signal.

The memory 133 is connected to the processor 131 and stores a protocol or parameter for an operation. For example, the memory 133 may store the MBMS SAI list.

A processor may include application-specific integrated circuits (ASICs), other chipsets, logic circuits, and/or data processing devices. A memory may include read-only memory (ROM), random access memory (RAM), flash memory, memory cards, storage media, and/or other storage devices. An RF unit may include a baseband circuit for processing a wireless signal. When an embodiment is implemented as software, the above-described technique may be implemented as a module (process, function, or the like) of performing the above-described function. The module may be stored in the memory and executed by the processor. The memory may be within or outside the processor, and may be connected to the processor via various well-known means.

Although methods in the above-described system are a series of operations or blocks and thus are described based on flowcharts, the present disclosure is not limited to the order of the operations, and operations may be performed in a different order from that described above or may be performed simultaneously. Moreover, it will be understood by one of ordinary skill in the art that the operations illustrated in a flowchart are not exclusive and thus another operation may be included in the illustrated operations or one or more operations may be deleted without affecting the scope of the present disclosure.

The aforementioned embodiments include various aspects of illustrations. Although all possible combinations for representing various aspects may not be described, one of ordinary skill in the art will understand that other combinations are possible. Accordingly, the present disclosure includes all other replacements, corrections, and modifications that belong to the accompanying claims.

The aforementioned embodiments may be described in terms of functional block components and various processing operations. Such functional blocks may be realized by any number of hardware and/or software components configured to perform the specified functions. For example, the aforementioned embodiments may employ various integrated circuit (IC) components, e.g., memory elements, processing elements, logic elements, look-up tables, and the like, which may carry out a variety of functions under the control of one or more microprocessors or other control devices. Similarly, where the elements of the aforementioned embodiments are implemented using software programming or software elements, the disclosed embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of techniques according to the related art for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative embodiments and are not intended to otherwise limit the scope of the embodiments in any way. For the sake of brevity, electronics, control systems, software development and other functional aspects of the systems according to the related art may not be described in detail. Furthermore, the connecting lines, or connectors shown in the various figures presented are intended to represent various functional relationships and/or physical or logical couplings between the various elements. It should be noted that many alternative or additional functional relationships, physical connections or logical connections may be present in a practical apparatus. Moreover, no item or component is essential to the practice of the embodiments described herein unless the element is specifically described as "essential" or "critical".

The various embodiments should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing communication, by a terminal in a wireless communication system, the method comprising:
  transmitting, a request message including a relay layer-2 group identity (ID) to a relay terminal, for requesting a monitoring of a temporary mobile group identity (TMGI), wherein the relay layer-2 group identity (ID) is predefined for a relay terminal;

receiving a response message including the relay layer-2 group ID from the relay terminal, in response to the request message;

receiving a control message including a layer-2 group ID from the relay terminal, wherein the layer-2 group ID is different from the relay layer-2 group ID;

identifying the TMGI and the layer-2 group ID associated with the TMGI based on the control message; and receiving multimedia broadcast multicast service (MBMS) data based on the layer-2 group ID.

2. The method of claim 1, wherein the response message further comprises timer information about a time period during which the TMGI is monitored.

3. The method of claim 1, further comprising requesting a unicast distribution leg to a server providing a group communication application service in response to a reception of the control message being stopped.

4. The method of claim 1, further comprising identifying the relay terminal among at least one relay terminal located within a cell coverage area, based on a message received from the at least one relay terminal located within the cell coverage area.

5. A terminal for performing communication in a wireless communication system, the terminal comprising:
a transceiver; and
a processor coupled with the transceiver and configured to:
control the transceiver to transmit, a request message including a relay layer-2 group identity (ID) to a relay terminal, for requesting a monitoring of a temporary mobile group identity (TMGI), wherein the relay layer-2 group identity (ID) is predefined for a relay terminal,
receive a response message including the relay layer-2 group ID from the relay terminal, in response to the request message and receive a control message including a layer-2 group ID from the relay terminal, wherein the layer-2 group ID is different from the relay layer-2 group ID,
identify the TMGI and the layer-2 group ID associated with the TMGI based on the control message, and
control the transceiver to receive multimedia broadcast multicast service (MBMS) data based on the layer-2 group ID.

6. The terminal of claim 5, wherein the processor is further configured to identify the relay terminal among at least one relay terminal located within a cell coverage area, based on a message received from the at least one relay terminal located within the cell coverage area.

7. The terminal of claim 5, wherein the response message further comprises timer information about a time period during which the TMGI is monitored.

8. The terminal of claim 5, wherein the processor is further configured to request a unicast distribution leg to a server providing a group communication application service, in response to a reception of the control message being stopped.

9. A method for performing communication, by a relay terminal in a wireless communication system, the method comprising:
receiving, a request message including a relay layer-2 group identity (ID), for requesting a monitoring of a temporary mobile group identity (TMGI) from a terminal, wherein the relay layer-2 group identity (ID) is predefined for the relay terminal;
transmitting a response message including the relay layer-2 group ID from the relay terminal, in response to the request message;
transmitting a control message including the TMGI and a layer-2 group ID associated with the TMGI, wherein the layer-2 group ID is different from the relay layer-2 group ID; and
transmitting multimedia broadcast multicast service (MBMS) data.

10. The method of claim 9, wherein the response message further comprises timer information about a time period during which the TMGI is monitored.

11. A relay terminal for performing communication in a wireless communication system, the relay terminal comprising:
a transceiver; and
a processor coupled with the transceiver and configured to:
control the transceiver to receive, a request message including a relay layer-2 group identity (ID), for requesting a monitoring of a temporary mobile group identity (TMGI) from a terminal, wherein the relay layer-2 group identity (ID) is predefined for the relay terminal,
transmit a response message including the relay layer-2 group ID from the relay terminal, in response to the request message,
transmit a control message including the TMGI and a layer-2 group ID associated with the TMGI, wherein the layer-2 group ID is different from the relay layer-2 group ID, and
transmit multimedia broadcast multicast service (MBMS) data.

12. The relay terminal of claim 11, wherein the response message further comprises timer information about a time period during which the TMGI is monitored.

13. The relay terminal of claim 11, wherein the response message is transmitted based on a determination that a service area ID in the request message corresponds to a service area ID on a preset list.

* * * * *